US006901106B1

United States Patent
Chen et al.

(12) United States Patent
(10) Patent No.: US 6,901,106 B1
(45) Date of Patent: May 31, 2005

(54) DELAY LOCK CODE TRACKING LOOP EMPLOYING MULTIPLE TIMING REFERENCES

(75) Inventors: Yun-Yen Chen, Kaohsiung (TW); Muh-Rong Yang, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/420,846

(22) Filed: Oct. 19, 1999

(51) Int. Cl.[7] .................................................. H04L 7/02
(52) U.S. Cl. ..................................... 375/150; 375/354
(58) Field of Search ............................... 375/142, 144, 375/145, 148, 150, 152, 354

(56) References Cited

U.S. PATENT DOCUMENTS 5,299,229 A    3/1994  Zscheile, Jr. et al.
5,737,362 A    4/1998  Hyun et al.
6,154,487 A  * 11/2000  Murai et al. ................. 375/150

* cited by examiner

Primary Examiner—Amanda T. Le

(57) ABSTRACT

A code tracking system and method especially for use in direct sequence code division multiple access (DS-CDMA) communication systems employs multiple timing references within a chip by tracking the multiple timing references relative to the exact midpoint of the chip, then adjusting the timing references to the exact midpoint of the chip, and outputting an error tracking signal in accordance with the minimum error associated with the multiple timing references. The system performs effective code tracking with low lock-loss rate even when the noise of a receiving path interferes with detection of some of the timing references. The system uses multiple delay-locked loops for the different timing references.

6 Claims, 6 Drawing Sheets

DELAY LOCK CODE TRACKING LOOP EMPLOYING MULTIPLE TIMING REFERENCES

BACKGROUND OF TIE INVENTION

1. Field of the Invention

The present invention relates generally to code tracking systems and methods for use in a code division multiple access (CDMA) communication system, and particularly, in a direct sequence code division multiple access (DS-CDMA) communication system, or in a phase lock loop.

2. Description of the Related Art

In direct sequence code division multiple access systems, the performance of a code tracking loop affects the system performance greatly. In turn, the performance of the code tracking loop is dependent on the receiving environment of the receiver. The mean-time-to-lose-lock (MTLL) is an important performance criterion of the tracking loop. Ideally, events of losing lock should be as rare as possible; in other words, MTLL should be maximized.

Major factors introducing high occurrences of lockloss events include fading and high chip rate. In a multi-path fading or high chip rate environment, the change rate of the received signal is very fast. This phenomenon occurs particularly when the speed of the mobile unit is fast or the signal-to-noise ratio is low.

The receiver of a spread spectrum communication system should be able to adapt to a fast change in different environments without ceasing operation. In mobile radio communications, mobile units move quickly under various fading environments To receive a signal effectively, it is necessary to track the changes of the reception signal. Therefore, the receiver of the spread spectrum communication system generally has a synchronous tracking function for adapting to any change in the receiving environment.

In general, code tracking loops for spread spectrum communication systems can be classified as coherent and non-coherent tracking loops. The difference between coherent and non-coherent loops is that coherent loops use received carrier phase information as a reference, whereas non-coherent loops do not. Many coherent loops use correlation processing among the received signals, the early and late phase of received waveforms; such circuits are commonly referred to as delay-lock loops (DLL).

U.S. Pat. No. 5,299,229 discloses a spread spectrum receiver having a code tracking system for use with respect to a high rate pseudo-noise (PN) composite code formed of two PN codes, a high rate PN code and a low rate PN code. This patent provides a method for tracking the high rate PN code or the low rate PN code according to a data ratio in the tracking loop for a variable system.

U.S. Pat. No. 5,737,362 discloses a double delay-lock loop code tracking system for enlarging a linear section of an energy detecting area of the tracking loop by generating a code having numerous time differences relative to the midpoint of a chip as a timing reference. This patent uses an error detection unit for deciding the final output to the loop filter from a received energy of a signal de-spread by an early code advanced as much as $\Delta$ and $2\Delta$ and an energy of a signal de-spread by a late code delayed as much as $\Delta$ and $2\Delta$. The error energy detecting unit computes the results from these values, then outputs a control signal to a voltage controlled oscillator (VCO). The algorithm used for the error energy detecting unit enlarges the linear section of the tracking loop. Therefore, the system is more adaptive to track a signal under a fast changing environment. The disclosure of the above patents are incorporated by reference herein in their entireties.

A conventional delay-lock loop code tracking system comprises a phase discriminator, a loop filter and VCO, and a spread waveform generator (PN code generator). After demodulation, the received signal is input to the delay-lock discriminator where it is correlated with an early spreading pseudo-noise (PN) code advanced as much as $\Delta/2$, and a late spreading PN code delayed as much as $\Delta/2$. The parameter $\Delta$ is the total normalized time difference between the early and late discriminator channel (i.e., usually a chip).

FIG. 1 shows a general delay-lock code tracking loop comprising correlate-and-dump (or integrate-and-dump) units 10A, 10B, a local PN code generator 20, a VCO 30, a loop filter 40, and a tracking code decision unit 50. The code tracking loop receives an input signal on line 1, which consists of real and imaginary components. These components are provided to the correlate-and-dump units 10A, 10B where they are correlated by an early or late code generated by the local PN code generator 20. The energy obtained from correlate-and-dump units 10A, 10B for the early and late codes are supplied to the code tracking decision unit 50. The results computed by the code tracking decision unit 50 are used to adjust the correct time reference control for the local PN code generator 20. The adjustment is done by a loop filter 30 and voltage controlled oscillator 40. The PN code tracking of the DLL decision unit 50 is carried out conventionally by subtracting and processing the energy of two shifted versions of the auto-correlation finction of the early and late PN codes in order to obtain a nonlinear discriminator characteristic (S curve). The S curve possesses a zero-crossing at the on-time code position, which is needed for de-spreading and data modulation. The most important issue in designing a PN code tracking device is to be able to track as closely as possible the midpoint of a chip in a case where Doppler effects and channel noise disturb the loop operation.

Due to the finite width of the S curve, a sharp and short disturbance can push the tracking loop out of the locked region (i.e., lockloss). Thereafter, the receiver cannot resynchronize itself without restarting code acquisition. Code acquisition is a more time consuming process than code tracking. Thus, lockloss is undesirable and should be minimized.

SUMMARY OF THE INVENTION

It is an object of the present invention to provide a delay-locked (DLL) loop code tracking system which uses a predetermined number of timing references in a predetermined sequence for effectively tracking spread spectrum radio signals such as digitally modulated signals in a direct sequence code division multiple access (DS-CDMA) communication system.

It is a further object of the present invention to lower the occurrences of lockloss, especially when the mobile unit is operating in an environment of fading and is employed for high chip rate transmission such as in so-called third generation mobile communication systems. The present invention employs multiple timing references within a chip. The system tracks multiple ting references relative to the exact midpoint of a chip, then adjusts the timing references to the exact midpoint of the chip. If the timing reference for the exact midpoint of the chip fails to lock because of a sharp and short disturbance, the system can still recover the midpoint of a chip from the other timing references. As shown in simulation results of the present invention, the cases of lockloss are reduced greatly compared with the traditional DLL loop.

The present invention is especially well suited to direct sequence spread spectrum systems, such as DS-CDMA systems. In a CDMA system, a signal is modulated and demodulated by a spreading and de-spreading operation. The spreading process includes multiplying the input data by a pseudo-noise (PN) sequence, with the bit rate of the PN sequence being much greater than the data bit rate. The bit rate of the PN sequence is called the chip rate. When the signal is received, de-spreading is performed to remove the spreading from the desired signal by multiplying with the same PN code that must be exactly synchronized to the received PN code. Code acquisition and code tracking do the synchronization. Code acquisition is the process that searches the initial timing reference in order to synchronize with the received PN code. After code acquisition, code tracking ties to find the exact midpoint of a chip in order to recover the timing error. Since a chip consists of several samples for the correlate-and-dump unit, the energy can be calculated very precisely. Nevertheless, the likelihood of disturbed samples that introducing a tracking error is still not as low as acceptable. The issue is especially important for high chip rate transmission. For wireless mobile communication, a fast disturbance can cause a few samples in a chip to be inaccurate. Therefore, the tracking loop will lose lock if the disturbed samples are located around the midpoint of the chip. One way to improve the tracking performance is to enlarge the length of the correlators. However, this solution also enlarges the computation time accordingly. The present invention uses multiple reference code togs, each for tracking a pre-defined timing reference within a chip. Thus, the exact midpoint of the chip can be recovered by the other tracked timing references even if the midpoint tracking loop fails to lock due to fast fading.

The advantages of the present invention are as follows. First, the length of the correlators can be reduced relative to conventional systems; therefore a faster computation is achieved. Secondly, more than two sets of sampling points are used in parallel for code tracking; this improves the error rate of traditional code tracking which uses only one set of sampling points. The rate of tolerating error samples is increased because different samples are used for each of the timing references. The technique proposed in U.S. Pat. No. 5,737,362 uses only the midpoint of a chip as a reference point, and thus, the samples are still very Likely to be distorted because they are sampled from a neighbor region.

DETAILED DESCRIPTION OF THE PREFERRED EMBODIMENTS

In the following description, the invention will be described in detail, first by way of an example of a double reference code times tracking loop, with reference to the double timing references DLL tracking loop shown in FIG. 2.

Figure 1:
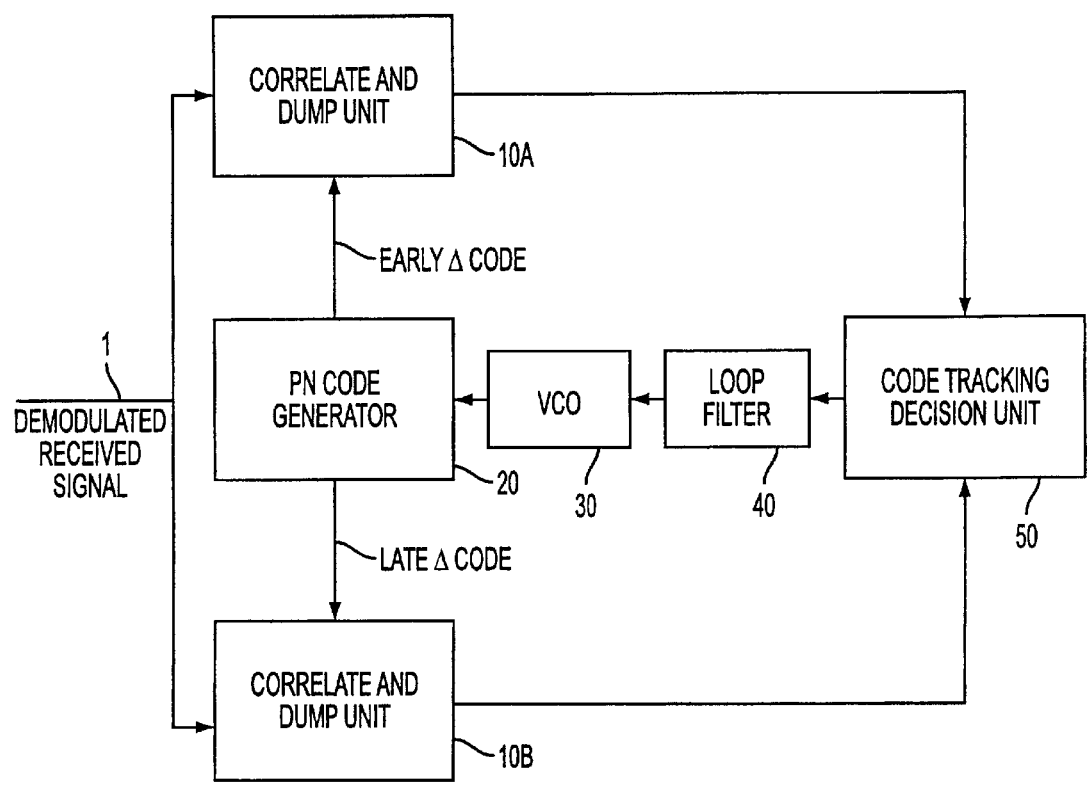
FIG. 1 shows a prior art delay-lock code tracking loop.
Figure 2:
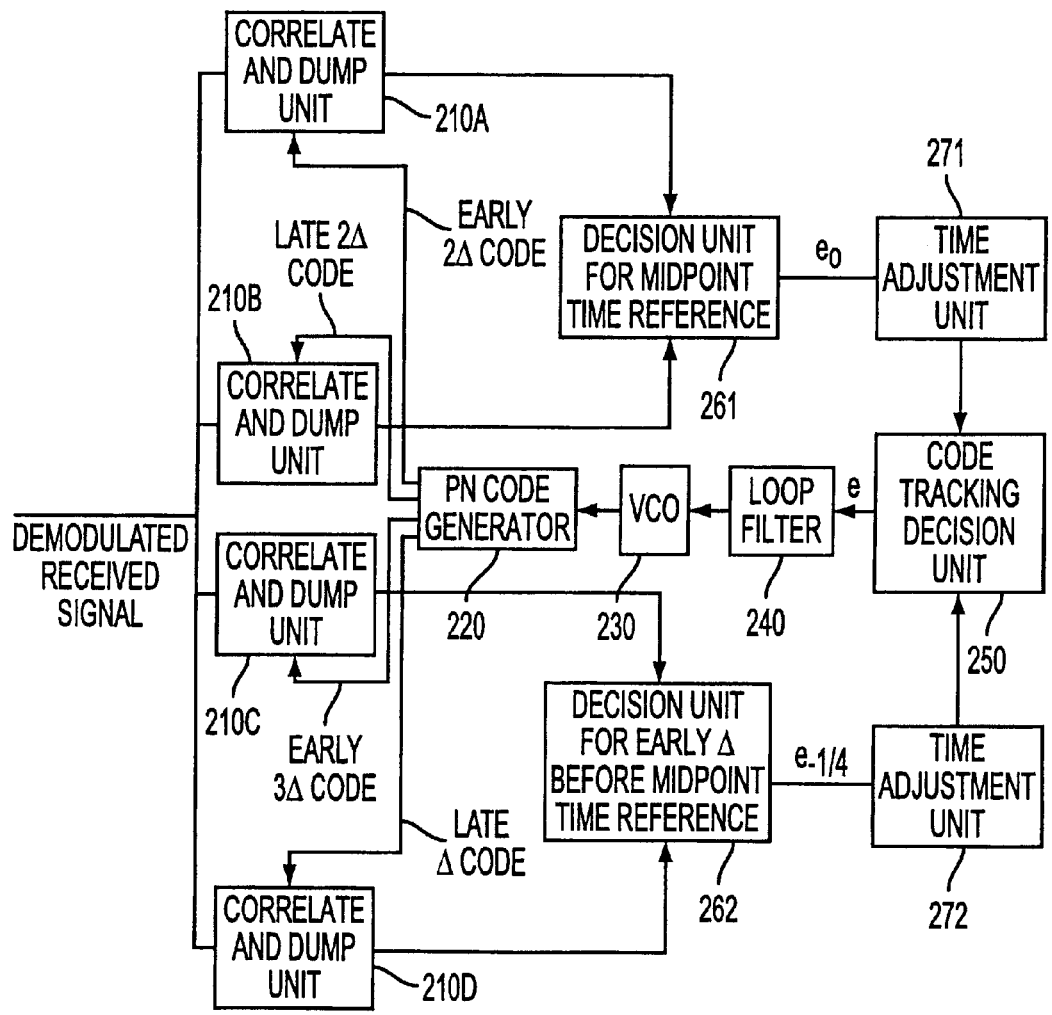
FIG. 2 illustrates a double timing reference DLL embodiment according to the present invention.

FIG. 2 illustrates a double timing reference DLL embodiment according to the present invention. This embodiment employs two reference code times, one for the midpoint of a chip denoted $T_0$ and the other for one-fourth chip duration timing offset preceding the midpoint of the chip, denoted as $T_{-1/4}$. Suppose these are eight samples per chip. The early code will be advanced four samples and the late code will be delayed four samples for tracking timing reference $T_0$ in one DLL loop. On the other hand, the early code will be advanced six samples and the late code will be delayed two samples for tracking timing reference $T_{-1/4}$ in the other DLL loop respectively. The early and late codes are generated by adding appropriate delay elements to the local PN code generator as, shown in FIG. 3.

In FIG. 2, the received signal is input to four correlate-and-dump units 210A–D for multiplying with the early and late codes, of the two timing references $T_0$ and $T_{-1/4}$, generated by local PN code generator 220. The correlate-and-dump outputs of the two DLL branches for each of the timing references are provided to decision units 261, 262 respectively where they are combined to obtain the chip timing error $e_0$ and $e_{-1/4}$. Decision unit 261 is for the midpoint time reference $T_0$, and decision unit 262 is for timing reference $T_{-1/4}$. The two timing errors $e_0$ and $e_{-1/4}$ are input to the time adjustment units 271, 272 (for example, delay elements) to offset the timing error appropriately. The outputs of the time adjustment units 271, 272 are fed into the tracking loop decision unit 250 which merges them to obtain the final timing error e. The resulting chip timing error e is smoothed by the loop filter 240 to control the voltage controlled oscillator 230, which drives the local PN code generator 220.

Figure 3:
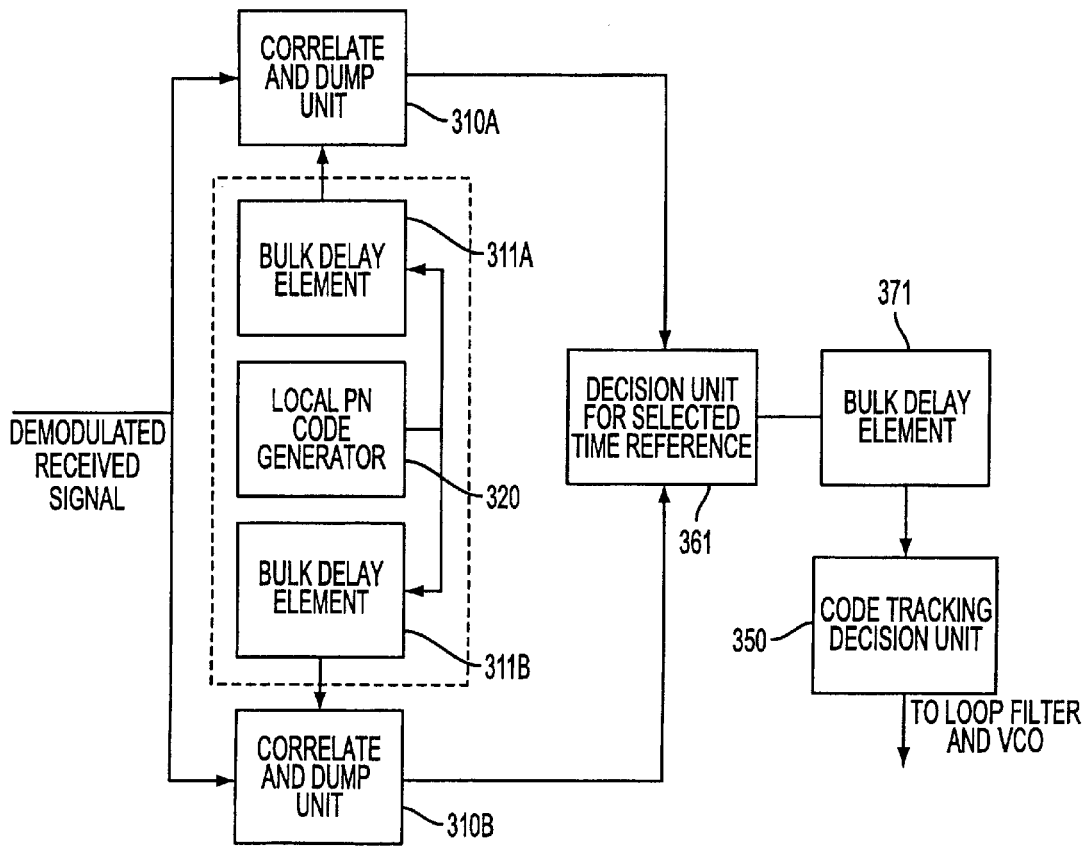
FIG. 3 shows a tracking loop implementation for timing reference $T_0$ and timing reference $T_{-1/4}$.

A tracking loop implementation for timing reference $T_0$ and timing reference $T_{-1/4}$ is shown in FIG. 3. As an example, the numbers of delays in the bulk delay element 311A for the early code in timing reference $T_0$ and reference $T_{-1/4}$ are 4 and 6 respectively, and the numbers of delays in the bulk delay element 311B for the late code in timing reference $T_0$ and reference $T_{-1/4}$ are 4 and 2, respectively. That is, the energy integrated from the early code advanced 4 samples and the late code delayed 4 samples will be input to the tracking decision unit for timing reference $T_0$, and the energy integrated from the early code advanced 6 samples and the late code delayed 2 samples will be input to the tracking decision unit for timing reference $T_{-1/4}$ By adjusting the number of delays in the bulk delay elements 311A and 311B of FIG. 3, a tracking loop for a particular selected timing reference which is associated with the different reference times can be obtained. After subtracting the energy which is correlated and dumped by multiplying the received waveform with the early and late PN codes, the tracking loop decision unit 361 outputs the decision signals for each timing reference $T_0$ and $T_{-1/4}$. These decision signals for an individual ting reference $T_0$ and $T_{-1/4}$ are passed to a bulk delay element 371 in order to adjust the time of all decision signals to the time of the midpoint of a chip. In this embodiment, the numbers of delays in the bulk delay element 371 for adjusting the time of decision signals for timing reference $T_0$ and timing reference $T_{-1/4}$ are 1 and 3 respectively. Thus, the decision signals can be merged to obtain a final improved decision signal for driving the loop filter.

Figure 4:
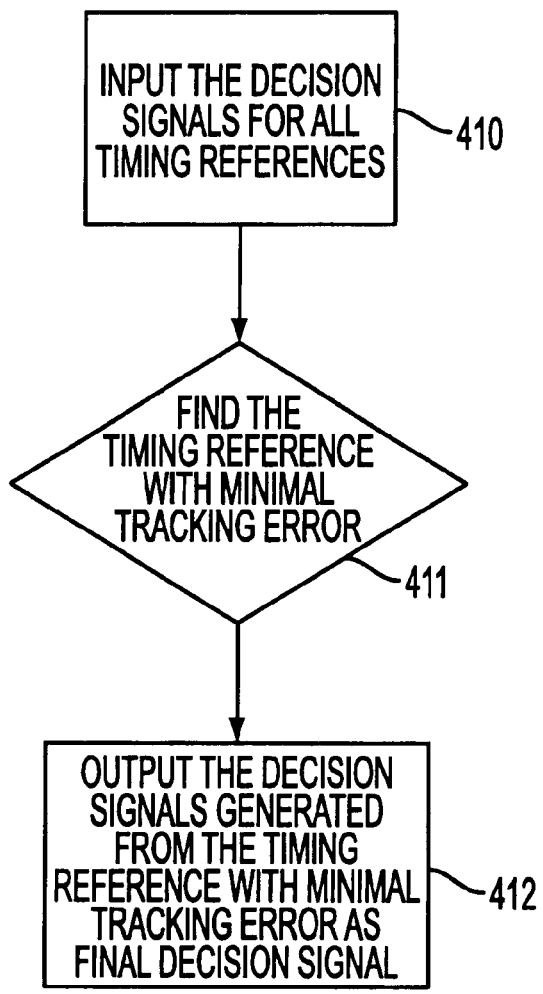
FIG. 4 is a decision flow chart of the final tracking decision unit of FIG. 3.

The decision flow of the final tracking decision unit is shown in FIG. 4. In step 410, the decision signals for all timing references are input to the tracking loop decision unit. In step 411, the tracking loop decision unit finds the timing reference with minima tracking error among all the input timing references, and, in step 412, outputs those decision signals generated from the tracking loop for the timing reference with minimal error as the final decision signal. In this example, the tracking loop decision unit simply compares the tracking errors of the two timing references, and selects the one with smaller error.

Figure 5:
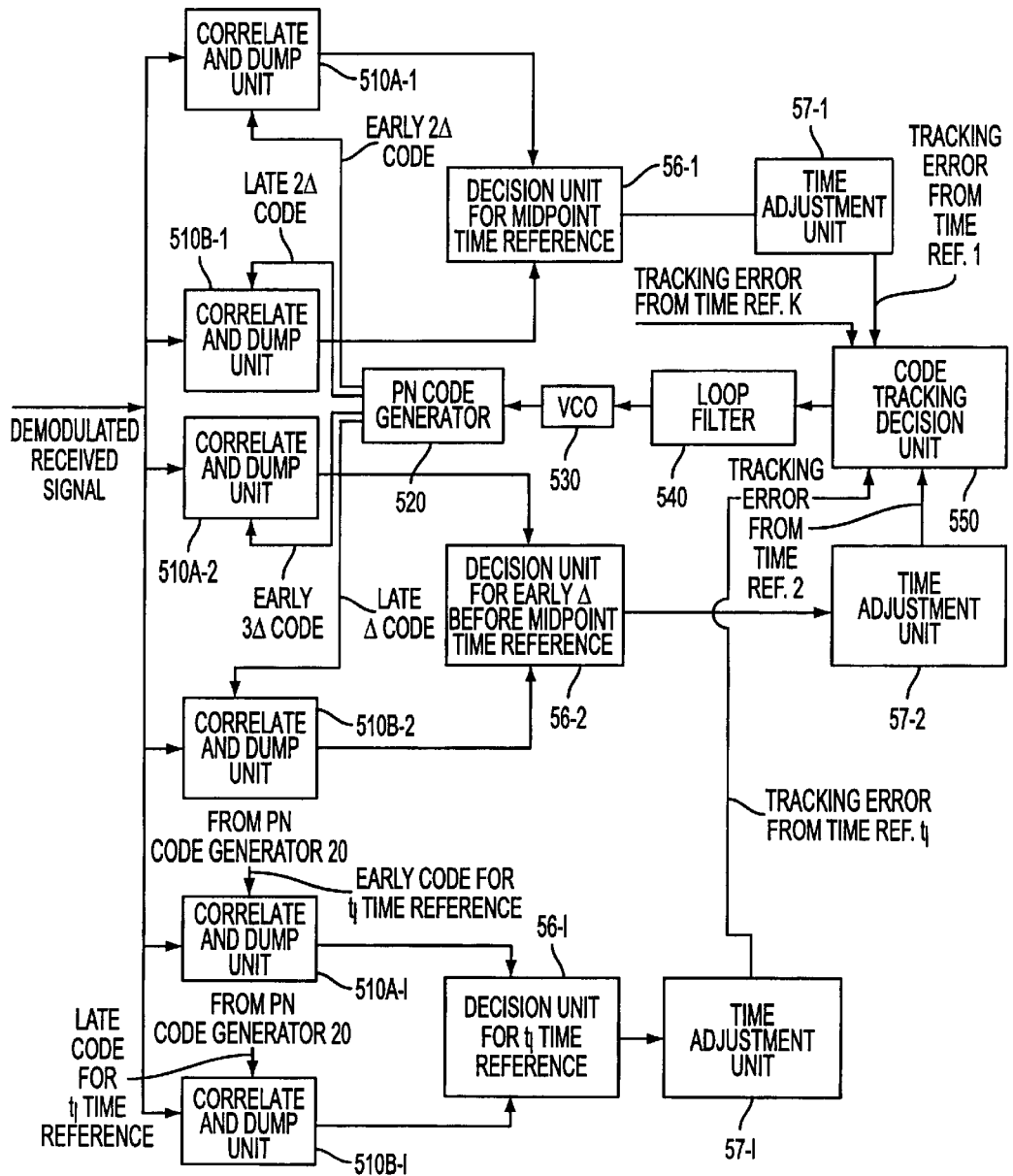
FIG. 5 shows a multiple timing references DLL embodiment according to the present invention.
Figure 6:
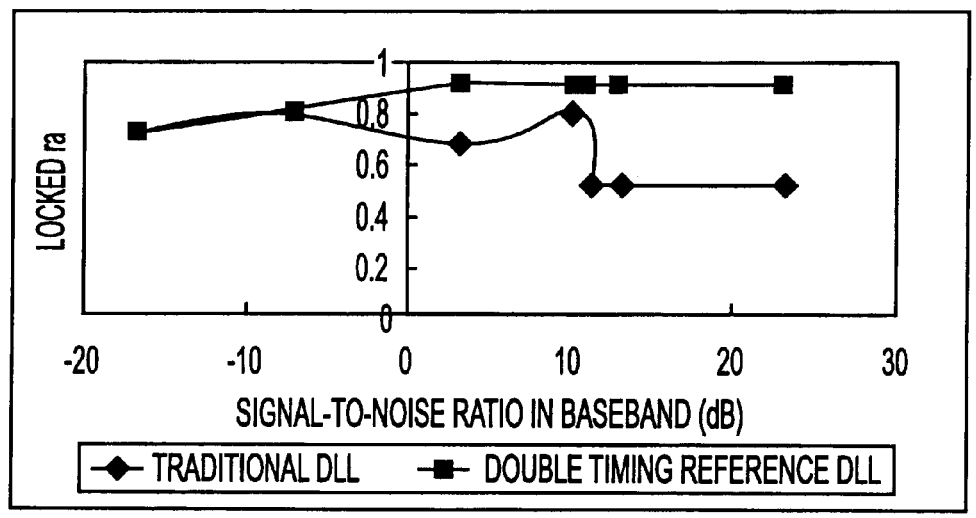
FIG. 6 shows the performance chart for traditional and double timing reference DLLs.

FIG. 5 shows a generalization of the double timing references DLL to multiple timing references DLL, by adding a tracking block for timing reference $t_l$, then merging the timing errors for each timing reference in tracking loop decision unit 550 which decides the final timing reference in a manner similar to the double timing reference DLL of FIG. 2. It will be apparent that the multiple timing reference DLL of FIG. 5 operates identically to the double timing reference DLL of FIG. 2 except for the employment of additional channels (up to l), The performance results of the double timing reference embodiment of the present invention compared with traditional DLL have been simulated by Cadence® SPW software. The multiple-dwell code acquisition is used in both simulation models for a double timing reference DLL and a traditional DLL tracking loop. There are three paths in the models for multi-path fading, the powers for first, second, and third paths are $1e{-}7$, $5e{-}8$, and $5e{-}8$ respectively. The Doppler frequency is 180 Hz given that the speed of mobile telephone units is around 60 Km/h. The tracking performance is measured by the ratio of locked duration versus overall simulation duration under different additive white noise power densities. FIG. 6 shows the performance chart for traditional and double timing reference DLLs. The X-axis is represented by the dB ratio between the normalized power of these three signal paths and the power of noise, while the Y-axis is the tracked (locked) rate of the DLL. Locked rate is computed from a ratio of the total time in lock to the total time simulated. Clearly, the double timing reference DLL achieves a significant improvement over traditional DLL. It should be noted that the re-acquisition process requires a much larger processing time and also decreases the locked rate.

Although the present invention has been fully described by way of examples with reference to the accompanying drawings, it should be understood that numerous variations, modifications and substitutions, as well as rearrangements and combinations, of the preceding embodiments will be apparent to those skilled in the art without departing from the novel spirit and scope of this invention. For example, it will be appreciated that the above embodiments may be implemented in software, firmware, hardware, etc. Also, the bulk delay elements for delaying the local PN code may be part of the PN generator unit itself or may be separate therefrom.

What is claimed is:

1. A code tracking system for a communication system comprising a multiple timing references delay-locked loop employing N timing references, N being $\geq 2$, said multiple timing references loop comprising:
   a pseudo-noise (PN) code generator that generates a local PN code;
   a code tracking means for tracking an input reception signal and said local PN code output from said PN code generator in accordance with said N timing references and outputting a tracking error signal;
   a loop filter that changes said tracking error signal to a stabilized signal; and
   a voltage controlling oscillator that receives said stabilized signal output by said loop filter and controls a code generation timing of said PN code generator so that a code of the reception signal and said local PN code output by the PN code generator coincide, wherein
   said code tracking means comprises:
      N timing reference tracking units that track each of said N timing references $T_i$ and output a decision signal $D_i$ for each timing reference $T_i$, where $1 \leq i \leq N$; and
      a code tracking decision unit that receives said decision signals $D_i$, finds a minimal tracking error from said decision signals $D_i$ and outputs a selected decision signal $D_i$ associated with one of said timing references associated with said minimal tracking error, said selected decision signal $D_i$ comprising said tracking error signal.

2. The code tracking system according to claim 1, wherein said timing reference tracking units comprise:
   a bulk delay element for outputting an early reception code advanced relative to the local PN code generated from said PN code generator by a predetermined early time;
   a bulk delay element for outputting a late PN code delayed relative to the local PN code generated from said PN code generator by a predetermined late time and;
   a first correlator for correlating the reception signal with the signal of said early PN code and outputting a correlation signal of early code;
   a second correlator for correlating the reception signal with the signal of said late PN code and outputting a correlation signal of late code;
   a tracking decision unit for receiving and subtracting the correlation signals of early code and of late code and outputting a decision signal comprising at least one of a re-acquisition signal and a tracking error signal;
   a bulk delay element for delaying said decision signal a predetermined adjustment time and outputting the delayed decision signal to said code tracking decision unit.

3. A code tracking system according to claim 2, wherein said first and second correlators are correlate-and-dump circuits.

4. A code tracking system according to claim 1, wherein said multiple timing references delay-locked loop is for use in a direct-sequence code division multiple access communication system.

5. A method of code tracking in a communication system, said method employing N timing references, N being $\geq 2$, said method comprising:
   (a) generating a local PN code;
   (b) tracking an input reception signal and said local PN code in accordance with said N timing references and outputting a tracking error signal;
   (c) changing said tracking error signal to a stabilized signal; and
   (d) employing said stabilized signal to control a code generation timing of said local PN code so that a code of the reception signal and said local PN code coincide, wherein
   step (b) comprises tracking each of said timing references and outputting decision signals associated with said timing references, finding a minimal tracking error from said decision signals and outputting a selected one of said decision signals associated with one of said timing references associated with said minimal tracking error as said tracking error signal.

6. A method according to claim 5, wherein said communication system is a direct-sequence code division multiple access communication system.

* * * * *